United States Patent Office 3,649,620
Patented Mar. 14, 1972

3,649,620
ALDOSTERONE 21-ESTERS AND 1-DEHYDRO ANALOGUES
Alberto Ercoli, Milan, Rinaldo Gardi, Carate Brianza, Romano Vitali, Casatenovo, and Giovanni Falconi, Carate Brianza, Italy, assignors to Warner-Lambert Company, Morris Plains, N.J.
No Drawing. Filed Feb. 16, 1970, Ser. No. 11,911
Claims priority, application Italy, Feb. 19, 1969, 13,033/69; Dec. 10, 1969, 25,583/69
Int. Cl. C07c 173/00
U.S. Cl. 260—239.55          14 Claims

ABSTRACT OF THE DISCLOSURE

Aldosterone 21-p substituted benzoates and their 1-dehydro-analogues having prolonged adrenocortical, hypertensive and gamma rays protecting activity are obtained by partial acid hydrolysis of the corresponding new 18,21-di-p substituted benzoates.

The present invention refers to novel long-acting 21-esters of a steroid selected from the group consisting of aldosterone and 1-dehydroaldosterone, to a process for their preparation and to pharmaceutical compositions containing said 21-esters as active ingredients.
The novel compounds of the invention are characterized by the following formula:

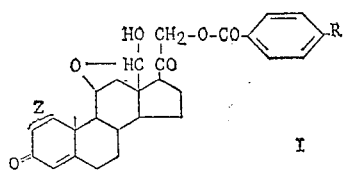

wherein R represents lower alkyl, halogen, lower alkoxy, cycloalkyloxy or nitro and Z represents a carbon-carbon single bond or a carbon-carbon double bond.
The term "lower alkyl," as used herein, comprises hydrocarbon radicals containing from one to four carbon atoms, inclusive, i.e. methyl, ethyl, propyl, butyl and their isomers. The lower alkoxy group is an ether group containing a lower alkyl as defined above and the cycloalkyloxy group includes a cycloaliphatic hydrocarbon radical containing from three to seven carbon atoms, inclusive.
It will be appreciated that the new 21-esters of this invention can exist in three tautomeric forms in accordance with the three tautomeric forms assigned to aldosterone and 1-dehydroaldosterone (aldehyde, hemiacetal and bis-epoxide forms) which are represented by the following scheme:

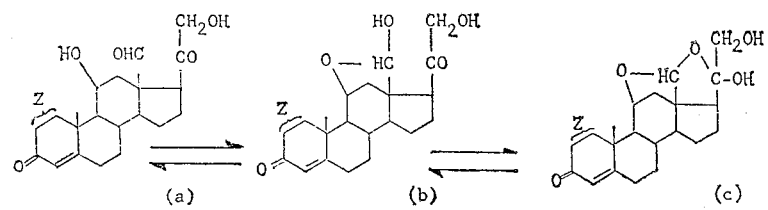

where Z is as defined above.
It is known (F. Gross; Symposium CIBA, 9, 173; 1961) that aldoesterone and its 21-acetate possess pronounced adrenocortical activity which, however, dies out in a very short time. Therefore, in order to obtain a valuable therapeutic effect it is necessary to administered said active products with a certain frequency. More prolonged activity has been instead ascribed to aldosterone 21-trimethylacetate.
It has now been found that the novel compounds of Formula I exhibit an extremely high and protracted activity and proved to be suitable both for the oral and parenteral administration.
In particular it has been shown that a single administration of the compounds of the present invention can maintain adrenalectomized rats alive for many months and allow an apparently normal development of the treated animals which, in spite of the severe operation, show a weight increase alike that of intact animals. Aldosterone 21-p-chlorobenzoate in particular, when administered subcutaneously in a single dose of 0.25 mg. to immature adrenalectomized rats, can maintain them alive for more than 130 days and allow their physical development almost normally.
It is also particularly interesting that the compounds of the invention exhibit their high activity even when orally administered. 1-dehydroaldosterone 21-p-chlorobenzoate, when orally administered in a daily dose of 0.1 μmole to adrenalectomized female rats, is able to maintain the animals alive for several months.
Further the compounds of the present invention give a certain protection against the effects of gamma rays irradiation. Unlike the products heretofore proposed for this purpose, for example cisteamine and AET (S-β-aminoethyl isothiuronium bromide hydrobromide), which are useful only when administered before irradiation (Annals of the New York Academy of Sciences, 141, 47; 1967), certain new 21-esters of aldosterone, and tehir 1-dehydro analogues, proved to be active in mice also when administered after irradiation.
Finally, the novel compounds of the present invention exhibit a good hypertensive activity since they are able to induce a very remarkable increase in the blood pressure of adrenalectomized rats.

PHARMACOLOGICAL DATA (A) Survival of adrenalectomized animals

The experiments were performed on immature adrenalectomized Sprague-Dawley rats each weighing about 50 g. Nine to twelve animals per group were employed. The compounds under examination were parenterally or orally administered within the second day after adrenalectomy. During the experiments the animals were fed Grollman diet (Endocrinology, 29, 855; 1941).
The experiments were divided into two groups according to the kind of administration carried out.
In the first group consisting of five different experiments the results of which are summarized in Table I— the compounds were parenterally administered and the activity of some aldosterone-21-esters of the invention was compared to that of aldosterone itself and to that of other already known aldosterone 21-esters.
In experiment No. 1, performed on rats which besides being adrenalectomized were also hypophysectomized aldosterone 21-anisate and aldosterone 21-p-nitrobenzoate, are compared with the free aldosterone given at a 5 times greater dose.

In experiment No. 3 the activity of aldosterone 21-p-chlorobenzoate is compared with that of aldosterone 21-trimethylacetate which, as well known, is the only one derivative to which a certain protracted activity has been ascribed (Symposium CIBA, 9, 173; 1961).

In experiment No. 4 the activity of aldosterone 21-p-chlorobenzoate is compared with that of aldosterone 21-benzoate, described in U.S. Pat. 2,862,925.

In experiment No. 2 the activity of aldosterone 21-p-toluate is given in comparison to the controls and in experiment No. 5 is reported the activity of aldosterone 21-p-chlorobenzoate, at two different dosage levels.

TABLE II

| Compounds tested: | Survival on the 30th day, percent |
|---|---|
| (Controls irradiated and not treated) | 20 |
| Aldosterone 21-p-chlorobenzoate | 34 |
| 1-dehydroaldosterone 21-p-chlorobenzoate | 27 |

Table II shows that aldosterone 21-p-chlorobenzoate and 1-dehydroaldosterone 21-p-chlorobenzoate offer a protection against the effects of gamma rays, which, even if it is seemingly not high, is however very interesting since other products which are known for their radioprotective activity are inactive in this test.

TABLE I

| Experiment Number | Compounds tested | μmole (single dose) | Survival (days) | Number of rats | Sex | Vehicle [1] | Day of treatment [2] | Route of administration |
|---|---|---|---|---|---|---|---|---|
| 1 (2278) | (Controls) | | 3.6±0.4 | 9 | F | SV | 1 | Intramuscular. |
| | Aldosterone | 5 | 6.3±0.2 | 9 | F | SV | 1 | Do. |
| | Aldosterone 21-anisate | 1 | 47.7±17.1 | 10 | F | SV | 1 | Do. |
| | Aldosterone 21-p-nitrobenzoate | 1 | 48.9±10.5 | 10 | F | SV | 1 | Do. |
| 2 (2412) | (Controls) | | 5.4±0.14 | 10 | M | Oil | 1 | Subcutaneous. |
| | Aldosterone 21-p-toluate | 1 | 57.0±6.7 | 10 | M | Oil | 1 | Do. |
| 3 (2591) | Aldosterone 21-trimethylacetate | 0.5 | 8.5±0.28 | 11 | F | SV | 1 | Do. |
| | Aldosterone 21-p-chlorobenzoate | 0.5 | 64.4±5.66 | 9 | F | SV | 1 | Do. |
| 4 (2459) | (Controls) | | 6.3±0.2 | 12 | M | Oil | 2 | Do. |
| | Aldosterone 21-benzoate | 1 | 16.4±3.1 | 11 | M | Oil | 2 | Do. |
| | Aldosterone 21-p-chlorobenzoate | 1 | 81.8±7.0 | 12 | M | Oil | 2 | Do. |
| 5 (2277) | do | 0.25 | 81.5±19.0 | 10 | M | SV | 1 | Intramuscular. |
| | do | 0.5 | 130.6±23.7 | 12 | M | SV | 1 | Do. |

[1] SV=suspending vehicle No. 17,874 (R.I. Dorfman, "Methods in Hormone Research" Academic Press, 2, 709; 1962). Oil=castor oil—sesame oil 1:1.
[2] Adrenalectomy on day 1.

It clearly results from Table I that, while free aldosterone is practically devoid of any protracted activity and aldosterone 21-trimethylacetate and 21-benzoate only display it in a rather scarce degree, the compounds of the present invention possess an exceptionally prolonged activity since they are able to maintain adrenalectomized rats alive for at least two months and in some cases even for 3–5 months.

Further, from experiments 3 and 4 it is shown that aldosterone 21-p-chlorobenzoate exhibits an activity extremely more prolonged than that of both aldosterone 21-benzoate and aldosterone 21-trimethylacetate.

In the second group of experiments we tested the activity of aldosterone 21-p-chlorobenzoate and 1-dehydro-aldosterone-21-p-chlorobenzoate when orally administered. The compounds were proved at three dose levels— namely 0.01, 0.1 and 1 μmoles daily. On day 115, 6 animals treated with aldosterone-21-p-chlorobenzoate (1 μmole) and 5 animals treated with 1-dehydroaldosterone-21-p-chlorobenzoate (0.1 μmole) were still alive.

From the above it is evident the extreme interest of the compounds of the invention as long-lasting adrenocortical agents also when administered by oral route.

(B) Protection against the effect of gamma rays radiations

The experiments were performed on groups of 30 adult female mice which had been irradiated by 877 rads in 10 minutes.

On the day following irradiation aldosterone 21-p-chlorobenzoate, and 1-dehydroaldosterone-21-p-chlorobenzoate, were administered by subcutaneous route in a single dose of 0.3 μmole in 0.2 cc. of SV (Suspending vehicle No. 17,874, see Table I). 30 days after irradiation the survival was determined as a percentage of the number of animals still alive over the treated animals.

(C) Effect on blood pressure

The experiments were performed on adrenalectomized Wistar rats to which 1 μmole/0.2 ml. castor-sesame oil aldosterone 21-p-chlorobenzoate and 1-dehydro-aldosterone 21-p-chlorobenzoate were administered by subcutaneous route.

On the 6th and 12th day after the treatment the blood pressure of the rats was measured and the percent increase was determined in comparison with the basal value.

The results obtained are summarized in Table III.

TABLE III

| Experiment Number | Compound tested | Percent increase pressure after— | |
|---|---|---|---|
| | | 6 days | 12 days |
| (2668) | Aldosterone 21-p-chlorobenzoate | 36 | 135 |
| | 1-dehydro-aldosterone-21-p-chlorobenzoate. | 100 | 145 |

A further experiment (2684) was carried out on intact male Wistar rats and aldosterone-21-p-chlorobenzoate and 1-dehydro-aldosterone-21-p-chlorobenzoate were intravenously administered at the dose of 0.1 μg./0.1 ml. of S.V. Determination of the arterial blood pressure effected 3, 9 and 27 minutes after the treatment pointed out for both compounds a sudden and remarkable increase of the blood pressure.

From the above it is evident the hypertensive effect showed by the compounds of the invention either when administered in low or high dose.

The new 21-esters of the present invention, therefore, can be considered useful as protective agents against gamma rays radiation of whatever origin and for the treatment of states of hypotension, or of chronic or also acute (both of infective and traumatic origin) adrenocortical insufficiency.

Thanks to their exceptional properties the novel compounds of the present invention can be administered in a single relatively low dose to obtain a protracted effect.

In accordance with the present invention the compounds of Formula I are formulated in pharmaceutical compositions in admixture with inert pharmaceutical solid or liquid carriers suitable for the oral or parenteral administration.

For example the compounds of the invention may be dissolved or suspended either in water or in an oil such as sesame oil, peanut oil, corn oil, coconut oil, cottonseed oil, linseed oil, olive oil, mono- and diglycerides as well as synthetic triglycerides, that is esters of glycerol with high molecular weight aliphatic acids either saturated or unsaturated, to obtain ampuls or multiple dose flacons.

Further they can be presented as suppositories in admixture with suppository bases such as, for example, cocoa butter, beeswax, higher aliphatic alcohols, glycols, cholesterol, zinc stearate and like or can be mixed with usual suitable carriers and presented as tablets, troches, pills, sugar-coated pills, capsules for the oral administration.

The compositions for the present invention contain the active ingredient in an amount of from about 0.01 to about 20 mg., preferably from 0.025 to 10 mg. and may be administered in a single dose by intramuscular, subcutaneous intravenous, rectal or oral route.

The novel 21-esters of the present invention are prepared by partial acid hydrolysis of the corresponding new 18,21-diesters derived from the semi-acetal form (b) characterized by the following general formula:

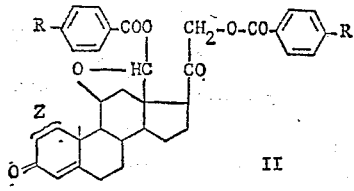

II in which R and Z have the above stated meaning.

According to said process, which represents another object of the invention, the new 18,21-diesters intermediates of Formula II are hydrolyzed in the presence of an acid catalyst.

It is advisable that the pH of the medium is maintained below 3 in order that the partial hydrolysis leads to 21-monoesters selectively. Under these conditions the esterifying group at 21-position is quite stable and consequently the compounds of Formula I are obtained in very high yields.

As an acid catalyst any mineral or organic acid preferably having a pKa lower than 5 can be employed, such as hydrochloric acid, hydrobromic acid, sulphuric acid, p-toluenesulphonic acid, perchloric acid, periodic acid, trichloroacetic acid, oxalic acid, dichloroacetic acid, sulphurous acid, phosphoric acid, fluoroacetic acid, bromoacetic acid, chloroacetic acid, citric acid, p-nitrobenzoic acid, formic acid or acetic acid. Preferred catalysts are the strong inorganic acids, in particular hydrochloric and perchloric acid and, among organic acids, p-toluenesulphonic acid, haloacetic acids and formic acid.

The reaction can be carried out in the presence of water and/or of a polar solvent at room temperature or by heating the mixture up to a temperature not higher than 80° C. Solvents which can be used include acetone, esters such as, for example, ethyl acetate, or ethers such as, for example, diethyl ether, dioxane or tetrahydrofurane. When weak acids, e.g. acetic acid, are used as acid catalysts, the same acids can also be employed as solvents.

The end products obtained are isolated according to usual methods, for example by simple filtration or by neutralization of the catalyst, evaporation of the solvent and recrystallization of the residue.

The new aldosterone 18,21-diesters and corresponding 1-dehydro-compounds intermediates of Formula II which represent a further object of the present invention are generally prepared by complete esterification of aldosterone and 1-dehydroaldosterone i.e. by treating these compounds with an excess of an esterifying agent derived from a R-p-substituted benzoic acid, for example an anhydride or a chloride, in the presence of a pyridine base, for example pyridine itself.

In order further to illustrate the invention the following examples are given.

EXAMPLE I

To a mixture of 100 cc. of anhydrous chloroform and 20 cc. of pyridine cooled at −20° C. there is added dropwise 20 cc. of p-chlorobenzoyl chloride and then a solution of 10 g. of aldosterone in 50 cc. of pyridine. The mixture is maintained at −20° C. for about 60 minutes and then overnight at 0–5° C. and finally poured into ice water and extracted with methylene chloride. The extract is washed with dilute hydrochloric acid, with a sodium bicarbonate solution and with water, then it is dried on anhydrous sodium sulphate. After elimination of the solvent under vacuum and crystallization of the residue from an ether-methylene chloride mixture, aldosterone 18,21-d-p-chlorobenzoate is obtained;

M.P. 215–218° C. $[\alpha]_D^{24} = +140°$ (dioxane, c.=0.5%)

Following the same procedure, the following 18,21-diesters are obtained.

Aldosterone 18,21-di-p-fluorobenzoate
Aldosterone 18,21-di-p-toluate
Aldosterone 18,21-di-p-nitrobenzoate
Aldosterone 18,21-di-anisate
Aldosterone 18,21-di-p-ethoxybenzoate

EXAMPLE 2

To a suspension of 16 g. of aldosterone 18,21-di-p-chlorobenzoate in 1600 cc. of 5% aqueous acetone there is added 32 cc .of 0.5 N perchloric acid and the mixture is heated on a boiling water bath. In about 5 minutes the diester is completely dissolved and within other 15–20 minutes a crystalline product begins to separate. Heating is continued for 90 minutes, then the mixture is left to cool at room temperature. The crystalline product, filtered and washed with ether, gives 6.2 g. of practically pure aldosterone 21-p-chlorobenzoate. Other 1.5 g. of product of satisfactory purity is obtained by concentration of the mother liquors under vacuum, filtration of the precipitate and digestion with hot acetone.

Recrystallization of the whole product from a methylene chloride-acetone-butanol mixture gives 6.7 g. of pure aldosterone 21-p-chlorobenzoate, M.P. 231–234° C. $[\alpha]_D^{24} = +90.5°$ (dioxane, c.=0.5%)

$\lambda_{max.}$ 239–240 m$\mu$, $E_{1cm.}^{1\%} = 690$

In an analogous manner:

aldosterone 21-p-fluorobenzoate; M.P. 231–232° C.; $[\alpha]_D^{24} = +102.5°$ (dioxane, c.=0.5%);

$\lambda_{max.}$ 234–235 m$\mu$; $E_{1cm.}^{1\%} = 558$ aldosterone 21-p-toluate; M.P. 233–235° C.; $[\alpha]_D^{24} = +93°$ (dioxane, c.=0.5%);

$\lambda_{max.}$ 240 m$\mu$, $E_{1cm.}^{1\%} = 645$ aldosterone 21-p-nitrobenzoate, M.P. 211–213° C.; $[\alpha]_D^{24} = +89.5°$ (dioxane, c.=0.5%);

$\lambda_{max.}$ 243–244 m$\mu$, $E_{1cm.}^{1\%} = 487$ aldosterone 21-anisate, M.P. 223–224° C.; $[\alpha]_D^{24} = +82°$ (dioxane, c.=0.5%);

$\lambda_{max.}$ 247–249 m$\mu$, $E_{1cm.}^{1\%} = 562$ aldosterone 21-p-ethoxybenzoate, M.P. 164–166° C.; $[\alpha]_D^{24}=+80°$ (dioxane, c.=0.5%);

$\lambda_{max.}$ 249–250 m$\mu$, $E_{1\,cm.}^{1\%}=494$ aldosterone 21-p-cyclopentyloxybenzoate, M.P. 163–164° C.; $[\alpha]_D^{24}=+70°$ (dioxane, c.=0.5%);

$\lambda_{max.}$ 250–251 m$\mu$, $E_{1\,cm.}^{1\%}=456$ are obtained.

EXAMPLE 3

To a mixture of 100 cc. of anhydrous chloroform and 20 cc. of pyridine cooled to −20° C. there is added dropwise 20 cc. of p-chlorobenzoyl chloride and then a solution of 10 g. of 1-dehydro-aldosterone in 50 cc. of pyridine. The mixture is maintained at −20° C. for about 60 minutes, then overnight at 0–5° C. and finally poured into ice-water and extracted with methylene chloride. The extract is washed with dilute hydrochloric acid, with a sodium bicarbonate solution and with water, then it is dried over anhydrous sodium sulphate. After elimination of the solvent under vacuum and crystallization of the residue from an ether-methylene chloride mixture, 1-dehydroaldosterone 18,21-di-p-chlorobenzoate is obtained.

Operating in the same manner, the following 18,21-diesters are obtained:

1-dehydro-aldosterone 18,21-di-p-fluorobenzoate,
1-dehydro-aldosterone 18,21-di-p-nitrobenzoate,
1-dehydro-aldosterone 18,21-di-p-toluate,
1-dehydro-aldosterone 18,21-di-anisate,
1-dehydro-aldosterone 18,21-di-p-ethoxybenzoate.

EXAMPLE 4

To a suspension of 16 g. of 1-dehydro-aldosterone 18,21-di-p-chlorobenzoate in 1600 cc. of 5% aqueous acetone there is added 32 cc. of 0.5 N perchloric acid and the mixture is heated on a boiling water bath. In about 5 minutes the diester is completely dissolved and within 15–20 minutes a crystalline product begins to separate. Heating is maintained for about 90 minutes, then the mixture is allowed to cool at room temperature. The crystalline product, filtered and washed with ether, gives 1-dehydroaldosterone 21-p-chlorobenzoate practically pure. Recrystallization of the product from a methylene chloride-acetone-butanol mixture gives pure 1-dehydro-aldosterone 21-p-chlorobenzoate, melting at 227–229° C.; $[\alpha]_D^{24}=+43\pm2°$ (dioxane, c.=0.5%)

$\lambda_{max.}$ 240–241 m$\mu$, $E_{1\,cm.}^{1\%}=644$

In an analogous manner are obtained: 1-dehydro-aldosterone 21-p-nitrobenzoate, melting at 218–220° C.; $[\alpha]_D^{24}=+47.5°$ (dioxane, c.=0.5%)

$\lambda_{max.}$ 250–252 m$\mu$, $E_{1\,cm.}^{1\%}=467$ 1-dehydro-aldosterone 21-p-fluorobenzoate;
1-dehydro-aldosterone 21-p-toluate;
1-dehydro-aldosterone 21-anisate;
1-dehydro-aldosterone 21-p-ethoxybenzoate.

EXAMPLE 5

50 mg. of aldosterone 21-p-chlorobenzoate are dissolved in 200 cc. of a 1:1 mixture of sesame oil-castor oil and the solution is poured into 2 cc. ampuls to obtain ampuls each containing 0.5 mg. of active substance.

EXAMPLE 6

Operation is carried out as in Example 5 using instead of aldosterone 21 - p - chlorobenzoate, 1-dehydro-aldosterone 21-p-chlorobenzoate.

EXAMPLE 7

100 mg. of aldosterone 21-anisate are dissolved in 200 cc. of sesame oil and the solution is poured into 2 cc. ampuls to obtain ampuls each containing 1 mg. of active substance.

EXAMPLE 8

A suspension having the following composition is prepared:

Aldosterone 21-p-chlorobenzoate—5 g.
Carbowax 4000—29 g.
Tween 80—4 cc.
Bidistilled water to 1000 cc.

The suspension so obtained is poured into 1 cc. ampuls to obtain ampuls each containing 5 mg. of active product.

EXAMPLE 9

A suspension having the following composition is prepared:

Aldosterone 21-p-chlorobenzoate—50 g.
Carbowax 4000—290 g.
Tween 80—40 cc.
Novadral [d,1-1-(3′ - hydroxyphenyl)-2-amino - ethanol hydrochloride, Diwag Chemische Fabriken G.m.b.H., Berlin]—100 g.
Bidistilled water to 10,000 cc.

The suspension so obtained is poured into 1 cc. ampuls to obtain ampuls each containing 5 mg. of active product.

We claim:
1. A compound of the formula:

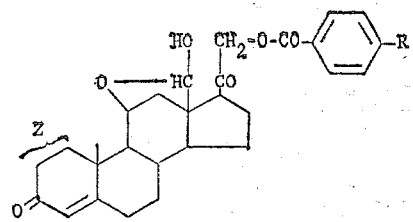

wherein R represents lower alkyl, halogen, lower alkoxy, a cycloaliphatic hydrocarbon radical containing from 3 to 7 carbon atoms, or a nitro group and Z represents a carbon-carbon single bond or a carbon-carbon double bond.

2. Aldosterone 21-p-chlorobenzoate.
3. Aldosterone 21-p-fluorobenzoate.
4. Aldosterone 21-p-toluate.
5. Aldosterone 21-anisate.
6. Aldosterone 21-p-ethoxybenzoate.
7. Aldosterone 21-p-cyclopentyloxybenzoate.
8. 1-dehydro-aldosterone 21-p-chlorobenzoate.
9. 1-dehydro-aldosterone 21-p-fluorobenzoate.
10. 1-dehydro-aldosterone 21-p-toluate.
11. 1-dehydro-aldosterone 21-anisate.
12. 1-dehydro-aldosterone 21-p-ethoxybenzoate.
13. Aldosterone 21-p-nitrobenzoate.
14. 1-dehydro-aldosterone 21-p-nitrobenzoate.

References Cited

UNITED STATES PATENTS

| | | | |
|---|---|---|---|
| 2,862,925 | 12/1958 | Reichstein et al. | 260—239.55 |
| 2,885,413 | 5/1959 | Hogg et al. | 260—397.45 |
| 2,982,767 | 5/1961 | Kerwin et al. | 260—239.55 |
| 3,374,230 | 3/1968 | Gardner et al. | 260—239.55 |

HENRY A. FRENCH, Primary Examiner

U.S. Cl. X.R.

424—241